United States Patent Office 3,445,471
Patented May 20, 1969

3,445,471
LOWER ALIPHATIC SULTONE DERIVATIVES OF SCOPOLAMINE AND ATROPINE
Jean P. M. Raudnitz, 10 Rue Anatole de la Forge, Paris, and Henri Wahl, 14 bis Blvd. Cotte, Enghien-les-Bains, Val-d'Oise, France
No Drawing. Filed Dec. 1, 1965, Ser. No. 510,960
Claims priority, application France, Dec. 3, 1964, 997,305
Int. Cl. C07d 43/10, 43/06; A61k 27/00
U.S. Cl. 260—292        9 Claims

ABSTRACT OF THE DISCLOSURE

A group of new compounds are prepared by the reaction of an aliphatic sultone of the formula

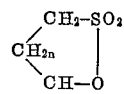

wherein $n$ is an integer of at least one, preferably one or two, with a tropane alkaloid, preferably 1-hyoscyamine, d-1-hyoscyamine (atropine), homatropine and scopolamine. These novel compounds may be represented by the formula $$Tr^+\text{—}A\text{—}SO_3^-$$

wherein A is an alkaline residue and $Tr^+$ is the residue of the starting tropane alkaloid linked to A through the nitrogen atom of the tropane nucleus.

This invention relates to tropane alkaloid derivatives. Tropane alkaloids are the naturally occuring group of alkaloids which are characterised by containing the tropane nucleus:

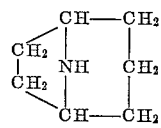

generally substituted on the nitrogen atom, e.g. by a lower alkyl group, and/or on the indicated carbon atom, e.g. by a hydroxyl group which is often esterified. Specific examples of such alkaloids include the following (all of which are substituted on the nitrogen atom): 1-hyoscyamine, d-1-hyoscyamine (atropine), homatropine, apoctropine, tropine, mandelyltropeine, pseudotropine, pseudotropeine, tropacocaine, scopolamine, meteloidine, tigloidine, valeroidine, convolamine, and dioscorine.

It is known that the pharmacological activity of such alkaloids in which the nitrogen atom is tertiary, e.g. atropine scopolamine and hyoscyamine, is modified in advantageous manner by the transformation of the alkaloid into a quaternary ammonium salt e.g. by reaction with an alkyl halide or another alkyl ester.

However, in the quaternary derivatives heretofore used, for example, methyl atropinium nitrate, methyl atropinium bromide and methyl homatropinium bromide, the anion is connected to the remainder of the molecule purely by an ionic bond.

The present invention provides tropane alkaloid derivatives of the formula:

$$Tr^+\text{—}A\text{—}SO_3^-$$

where Tr is the residue of a tropane alkaloid joined to A via the nitrogen atom of the tropane nucleus, the said nitrogen atom being quaternary, and A is an alkylene residue. These new derivatives are made, in accordance with a feature of the invention, by reacting atropane alkaloid in which the nitrogen atom of the tropane nucleus is tertiary with an aliphatic sultone, preferably in equimolecular quantities and in acetone. The alkane sultone may in particular be propane-1,3-sultone or butane-1,4-sultone. It is believed that an internal salt is formed in the reaction, the group which carries the negative charge being covalently connected to the quaternary nitrogen atom by a chain of carbon atoms. Thus, starting with a sultone of the formula:

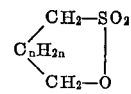

in which $n$ designates an integer at least equal to 1, preferably 1 or 2, the reaction is believed to result in the formation of a compound having the partial formula:

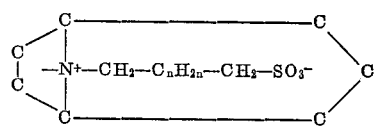

The preparation of the new compounds is preferably carried out in acetone, the use of which enables the reaction to be carried out without heating, and gives a particularly pure product.

The following examples, in which the melting points are instantaneous melting points, illustrate the preparation of the new derivatives.

EXAMPLE 1

To a cold solution of 29 g. of atropine in 250 ml. of acetone a solution of 13 g. of propane-1,3-sultone in 100 ml. of acetone is gradually added. The combined solution is left for 48 hours. The white precipitate of fine crystalline needles is separated, washed several times with acetone, and then recrystallised from ethanol. It melts at 220° C.

This salt is very soluble in water, insoluble in the cold in ethanol, fairly soluble in the same solvent when hot, and insoluble in acetone and diethyl ether. The proportions of nitrogen and sulphur show that there is a simple addition of the two starting materials.

EXAMPLE 2

Operating as in Example 1, and starting with scopolamine (30 g.) and propane-1,3-sultone (13 g.), a white powder is obtained with a melting point higher than 270° C. The powder is very soluble in water, and is not precipitated in alkaline media. It is insoluble in diethyl ether and acetone, and soluble in ethanol, particularly when hot.

EXAMPLE 3

29 g. of atropine are dissolved with gentle heating in 200 ml. of acetone. After cooling, 13.5 to 14 g. of butane-1,4-sultone diluted with 50 ml. of acetone are added. The mixture is left at normal temperature for 2 to 3 weeks. A white precipitate is gradually formed and this is separated by filtration and washed with acetone. The white product obtained (M.P. 240° C.) is very soluble in water, whether neutral, acid, or alkaline.

EXAMPLE 4

By working in the same manner as in Example 3 and starting with scopolamine, a product melting at 250–255° C. is obtained.

The analysis of the new compounds described above are as follows:

| | Analysis, percent | | | |
|---|---|---|---|---|
| | Found | | Calculated | |
| Examples | N | S | N | S |
| 1 | 3.3 | 7.8 | 3.4 | 7.75 |
| 2 | 3.3 | 7.3 | 3.2 | 7.40 |
| 3 | 3.4 | 7.6 | 3.3 | 7.50 |
| 4 | 3.0 | 7.2 | 3.1 | 7.15 |

The pharmacological properties of the compound formed by the reaction of atropine with propane-1,3-sultone are set out below.

Perorally (gastric passage), even in the large dose of 5 g./kg., this compound does not cause death in a batch of 10 mice. Intravenously, the 50% lethal dose is 340 mg./kg., whereas that of methyl atropinium bromide is about 13 mg./kg.

The new compound inhibits the effect of acetylcholine, in a concentration of $2.10^{-6}$, the effect beginning at a concentration of $1.10^{-6}$. In a concentration of $5.10^{-6}$, it has a spasmolytic action on the isolated duodenum, this action being very intense at a concentration of $1.10^{-5}$.

On direct application it causes dilation of the pupil, as does atropine. The new compound does not have any action on the arterial blood pressure in a dose of 200 mg./kg., but at about 300 mg./kg., it causes a slow, progressive decrease in the pressure (in a 3 kg. rabbit). It increases hypertension caused by adrenalin and attenuates the bradycardic reflex. In the dose of 200 mg./kg., it reduces the hypotensive activity of acetyl-choline (in a dose of 2 to 3 mg.) and suppresses this effect at doses of 300 mg./kg. or greater. Finally, it inhibits the hypotensive effect of nicotine.

The product is thus parasympatholytic but of very low toxicity, the effect being peripheral and partially ganglioplegic.

Albino rats (about 60 g.), divided into two batches, have satisfactorily withstood the daily oral administration of 50 mg./kg. of the compound for 40 days. No appreciable disturbance of the weight curve, blood pattern or renal functoin was observed, nor any specific organic lesion in the kidneys, spleen, liver, stomach, suprenal glands, or intestines.

The product made from propane-1,3-sultone and scopolamine has similar properties. It is spasmolytic but only partially parasympatholytic. Thus, for example, it lowers the intestinal tonus in a concentration of $1.10^{-6}$ and the spasmolysis is very strong at a concentration of $4.10^{-6}$, whereas it only partially inhibits acetylcholine at a concentration of the order of $4.10^{-6}$.

The new compounds, especially that obtained from propane sultone and atropine, can be used theropeutically as spasmolytics, particularly in the treatment of vagotonias.

The invention accordingly includes within its scope pharmaceutical compositions comprising one of the new compounds in association with a pharmaceutically acceptable carrier. Such compositions can be presented, for example in a form suitable for oral administration, especially tablets, or as an aqueous alcohol solution for absorption in drop form, or even as a sterile injectible solution, in e.g. physiological saline, for parenteral, particularly intramuscular, administration, or as suppositories.

Example of tablet

| | | |
|---|---|---|
| Product of the reaction of propane-1,3-sultone and atropine | mg | 1 |
| Starch | mg | 350 |
| Lactose | mg | 500 |
| Talcum | mg | 100 |
| Magnesium stearate, q.s. to | mg | 1000 |

Example of injectable solution

| | | |
|---|---|---|
| Product | mg | 10 |
| Physiological serum, q.s. to | ml | 1 |

Example of suppository

| | | |
|---|---|---|
| Product | mg | 10 |
| Cocoa butter, q.s. to | mg | 3 |

Example of drops

| | | |
|---|---|---|
| Product | mg | 250 |
| Water | ml | 90 |
| Alcoholic tincture of methanol q.s. to | ml | 100 |

The clinical observations set out below illustrate the therapeutic interest of the product formed by the reaction of atropine with propane-1,3-sultone.

(1) *Stomach.*—An invalid suffering from stomach pains resulting from an ucler received daily, in two doses, four tablets of the formulation given above. A short time after the medicine had been absorbed, the pains disappeared without any side effects, such as dryness of the mouth or dilation of the pupil.

(2) *Biliary duct.*—The patient had chronic biliary dyskinesia with constipation following serious hepatitis. Two tablets, twice a day, produced rapid sedation of the pains.

(3) *Urinary duct.*—The patient had lithiasis, with repeated formation of calculi and reflex spasms of the ureter. One ampoule containing a dose of 10 mg. injected intramuscularly relieved the spasm and allowed expulsion of the calculus.

(4) *Gynaecology.*—The patient had painful menses necessitating going to bed with each menstruation, and had an impression of afterpains. One suppository morning and evening, containing a dose of 10 mg. for four days, immediately alleviated the pain.

(5) *Pediatrics.*—The patient was 10 months old, and suffered from cachexia caused by frequent vomiting. 10 drops of a 0.25% solution, three times per day, brought about cessation of the vomiting, allowing normal feeding with increase in weight.

We claim:

1. A tropane alkaloid derivative of the formula:

$$Tr^+ - A - SO_3^-$$

where Tr is the residue of a tropane alkaloid from the group consisting of atropine and scopolamine joined to A via the nitrogen atom of the tropane nucleus, the said nitrogen atom being quaternary, and A is an alkylene residue of three or four carbon atoms.

2. A tropane alkaloid derivative as claimed in claim 1, in which Tr is the residue of atropine.

3. A tropane alkaloid derivative as claimed in claim 1 in which Tr is the residue of scopolamine.

4. A tropane alkaloid derivative as claimed in claim 1, in which A is $-(CH_2)_3-$.

5. A tropane alkaloid derivative as claimed in claim 1 in which A is $-(CH_2)_4-$.

6. A tropane alkaloid derivative as claimed in claim 2, in which A is $-(CH_2)_3$.

7. A tropane alkaloid derivative as claimed in claim 2, in which A is —(CH$_2$)$_4$.

8. A tropane alkaloid derivative as claimed in claim 3, in which A is —(CH$_2$)$_3$.

9. A tropane alkaloid derivative as claimed in claim 3, in which A is —(CH$_2$)$_4$.

References Cited

UNITED STATES PATENTS 2,146,646   9/1934   Nusslein et al. _____ 260—294.8

OTHER REFERENCES

Klingsberg: Pyridine and Derivatives, Part 2, Interscience, 1961, pp. 8, 9.

HENRY R. JILES, *Primary Examiner.*

A. L. ROTMAN, *Assistant Examiner.*

U.S. Cl. X.R.

424—265